United States Patent
Bonn (10) Patent No.: US 11,145,090 B2
(45) Date of Patent: Oct. 12, 2021

(54) FLAME FINDING WITH AUTOMATED IMAGE ANALYSIS

(71) Applicant: Deep Seek Labs, Inc., Winthrop, WA (US)

(72) Inventor: David Bonn, Winthrop, WA (US)

(73) Assignee: Deep Seek Labs, Inc., Winthrop, WA (US)

( * ) Notice: Subject to any disclaimer, the term of this patent is extended or adjusted under 35 U.S.C. 154(b) by 0 days.

(21) Appl. No.: 16/850,800

(22) Filed: Apr. 16, 2020

(65) Prior Publication Data

US 2021/0049789 A1 Feb. 18, 2021

Related U.S. Application Data (60) Provisional application No. 62/887,860, filed on Aug. 16, 2019.

(51) Int. Cl.
*G06T 7/00* (2017.01)
*G01J 5/00* (2006.01)

(52) U.S. Cl.
CPC .............. *G06T 7/97* (2017.01); *G01J 5/0018* (2013.01); *G06T 2207/10048* (2013.01); *G06T 2207/20084* (2013.01)

(58) Field of Classification Search
CPC ......... G06T 7/97; G01J 5/0018; G08B 17/125
See application file for complete search history.

(56) References Cited

U.S. PATENT DOCUMENTS

| 2003/0141980 A1 | 7/2003 | Moore et al. |
| 2009/0040367 A1* | 2/2009 | Zakrzewski ........... G06K 9/629 348/370 |
| 2009/0315722 A1* | 12/2009 | Hou ..................... G08B 17/125 340/578 |
| 2013/0050466 A1 | 2/2013 | Cetin et al. |

(Continued)

OTHER PUBLICATIONS

Arrue, B.C., et al., "An Intelligent System for False Alarm Reduction in Infrared Forest-Fire Detection," IEEE Intelligent Systems 15(3):64-73, May/Jun. 2000.

(Continued)

*Primary Examiner* — Myron Wyche
(74) *Attorney, Agent, or Firm* — Christensen O'Connor Johnson Kindness PLLC (57) ABSTRACT

A computer system determines a likelihood of the presence of flame in a scene. The system obtains a series of digital infrared and optical images of the scene; identifies a candidate region in a location of the scene based on analysis of the infrared images;
identifies an optical image slice based on analysis of the optical images and the location of the candidate region; and determines a likelihood of the presence of flame in the scene based on analysis of the optical image slice. Analysis of the infrared images includes detecting a high-temperature image region that exceeds a threshold temperature; detecting a turbulent motion image region; and determining whether the turbulent motion region is within a specified proximity of or overlaps with the high-temperature region. The optical image slice may be provided to a trained neural network, which returns a degree-of-confidence value that indicates whether flame is present.

22 Claims, 7 Drawing Sheets

(56) References Cited

U.S. PATENT DOCUMENTS

2014/0192184 A1* 7/2014 Wu ...................... G08B 17/005
348/135

OTHER PUBLICATIONS

Dunnings, A.J., and T.P. Breckon, "Experimentally Defined Convolutional Neural Network Architecture Variants for Non-Temporal Real-Time Fire Detection," Proceedings of the 25th IEEE International Conference on Image Processing (ICIP), Athens, Oct. 7-10, 2018, pp. 1358-1362.
Srock, A.F., et al., "The Hot-Dry-Windy Index: A New Fire Weather Index," Atmosphere 9:279, 2018, 11 pages.
Töreyin, B.U., et al., "Computer Vision Based Method for Real-Time Fire and Flame Detection," Pattern Recognition Letters 27:49-58, 2006.
Wooster, M.J., et al., "Thermal Remote Sensing of Active Vegetation Fires and Biomass Burning Events," 2013, pp. 347-390, Chapter 18, in "Thermal Infrared Remote Sensing," Springer, Dordrecht.
Yu, C., et al., "A Real-Time Video Fire Flame and Smoke Detection Algorithm," Procedia Engineering 62:891-898, 2013.
Iandola, F.N., et al., "Squeezenet: Alextnet-Level Accuracy With 50x Fewer Parameters and <0.5mb Model Size," <https://arxiv.org/abs/1602.07360> [retrieved Aug. 13, 2019], 3 pages.
Howard, A.G., et al., "MobileNets: Efficient Convolutional Neural Networks for Mobile Vision Applications," <https://arxiv.org/abs/1704.04861> [retrieved Aug. 13, 2019], 3 pages.
International Search Report and Written Opinion dated Oct. 29, 2020, issued in corresponding International Application No. PCT/US2020/046542, filed Aug. 14, 2020, 8 pages.

* cited by examiner

FLAME FINDING WITH AUTOMATED IMAGE ANALYSIS

CROSS-REFERENCE TO RELATED APPLICATION

This application claims the benefit of U.S. Provisional Application No. 62/887860, filed on Aug. 16, 2019, which is incorporated herein by reference.

BACKGROUND

Previous attempts to detect fire in digital images have focused on detecting features of optical (visible) light images, based on the idea that if fire is present in an image, it will appear very bright compared to other parts of the image. Although this is true in principle, optical image analysis alone is insufficient to provide accurate flame detection. As an example of the drawbacks of such limited analysis, flames are a very bright feature and, being very bright, it is difficult to distinguish flames from other very bright features within an image. Consider an image of a landscape at night where a flame and a bright floodlight are both present. If pixels associated with the flame and pixels associated with the floodlight both exceed the maximum brightness level of the image, these two regions may appear very similar in the image, i.e., they will include flat, white regions of clipped pixel values. This can make it very difficult to distinguish flames from other bright features in images.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computer system is programmed to determine a likelihood of the presence of flame in a scene by performing operations comprising obtaining a series of digital infrared images and digital optical images of a scene; identifying a candidate region in a location of the scene based at least in part on analysis of the series of digital infrared images; identifying an optical image slice based at least in part on analysis of the series of digital optical images and the location of the candidate region; and determining a likelihood of the presence of flame in the scene based at least in part on analysis of the optical image slice. In an embodiment, analysis of the series of digital infrared images includes detecting one or more high-temperature image regions in the series of digital infrared images that exceed a threshold temperature; and detecting one or more turbulent motion image regions in the series of digital infrared images. In an embodiment, analysis of the series of digital infrared images further includes determining whether a turbulent motion image region is within a specified proximity of or overlaps with a high-temperature image region.

In an embodiment, identifying the optical image slice comprises identifying the brightest pixel in an optical image region corresponding to the candidate region. In an embodiment, analysis of the optical image slice includes passing the optical image slice as input to a trained neural network. The system can obtain a degree-of-confidence value from the trained neural network that indicates whether flame is present in the optical image slice.

In an embodiment, the computer system performs one or more further operations based on the determined likelihood of the presence of flame in the scene, such as setting an alarm state; transmitting a signal to a remote computing device; activating a visual or audible alarm; activating a fire suppression system; generating one or more automated messages or phone calls; causing information to be displayed on a roadway variable-message sign, or a combination of two or more such operations.

In another aspect, a computer system is programmed to determine regions in digital infrared images that are likely to include flame by performing operations comprising obtaining a series of digital infrared images of a scene; detecting one or more high-temperature image regions in the scene that exceed a threshold temperature based on analysis of the series of digital infrared images; detecting one or more turbulent motion image regions in the scene based on analysis of the series of digital infrared images; and identifying one or more candidate regions for location of flame in the series of digital infrared images based at least in part on locations of the one or more high-temperature image regions and the one or more turbulent motion image regions. In an embodiment, the operations further include determining whether one or more of the detected turbulent motion image regions are within a specified proximity of, or overlap with at least one of the one or more high-temperature image regions.

In embodiments described herein, a system may include one or more digital infrared cameras, one or more digital optical cameras, or combinations thereof. In an embodiment, the system obtains digital infrared images by capturing such images with one or more digital infrared cameras. In an embodiment, the system obtains digital optical images by capturing such images with one or more digital optical cameras.

In embodiments described herein, threshold temperatures or other variables may be based on an adjustable sensitivity level to adjust for different fire conditions, equipment configurations, user preferences, or other factors.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure is directed to an image-based flame detector designed to provide early warning of fires, such as wildfires, which may be of particular significance to fire departments, government agencies, and residents of the wildland-urban interface, among other potential uses.

Previous attempts to detect fire in digital images have focused on detecting features of optical (visible) light images, based on the idea that if fire is present in an image, it will appear very bright compared to other parts of the image. Although this is true in principle, optical image analysis alone is insufficient to provide accurate flame detection. As an example of the drawbacks of such analysis, flames are a very bright feature and, being very bright, it is difficult to distinguish flames from other very bright features within an image having a reasonable dynamic range. Consider an image of a landscape at night where a flame and a bright floodlight are both present. If pixels associated with the flame and pixels associated with the floodlight both exceed the maximum brightness level of the image, these two regions may appear very similar in the image, i.e., they will include flat, white regions of clipped pixel values. This can make it very difficult to distinguish flames from other bright features in images, especially at larger distances. Another drawback is that optical images are unable to detect hot gases, which are distinctive features of fire but are invisible in the visible spectrum.

To address these or other technical problems, described embodiments include an image-based flame-detection system. The system analyzes digital infrared (IR) images of a scene to identify regions in a scene that are likely to include fire. In an embodiment, the system also analyzes optical images to help identify with more confidence and specificity the likely location of fire in the scene. Candidate regions in the IR images and/or corresponding optical image slices can then be evaluated with a machine learning system to assess the likelihood of the presence of fire.

In this process, the system obtains and analyzes pixel values in digital images (e.g., IR and optical images). In general, pixels are defined by a set of one or more sample values, with the number, meaning, and value range of the respective samples being determined by factors such as the format, color space, and bit depth (number of bits per channel) of the images. It will be understood that the techniques and tools described herein can be adapted for analysis of digital images of various formats, resolutions, color spaces, bit depths, etc. Various techniques for upscaling or downscaling image resolution, converting color images to grayscale, converting images from one format to another, or other image processing techniques can be employed in combination with techniques described herein.

In an embodiment, the system includes a thermal infrared (IR) camera integrated with a computer system. The system automatically captures a series of IR images over time (e.g., as video or still images) using the IR camera, and analyzes the captured IR images. In an embodiment, the system further includes an optical camera, which can be used to capture a series corresponding optical images over time.

Figure 1A:
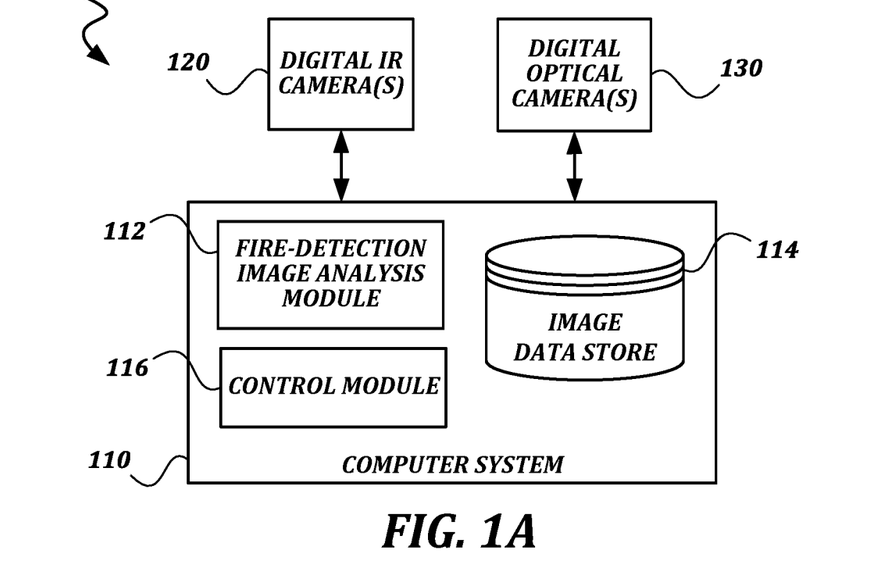
FIGS. 1A and 1B are block diagrams of an automated fire-detection image analysis system in which described embodiments may be implemented.
Figure 1B:
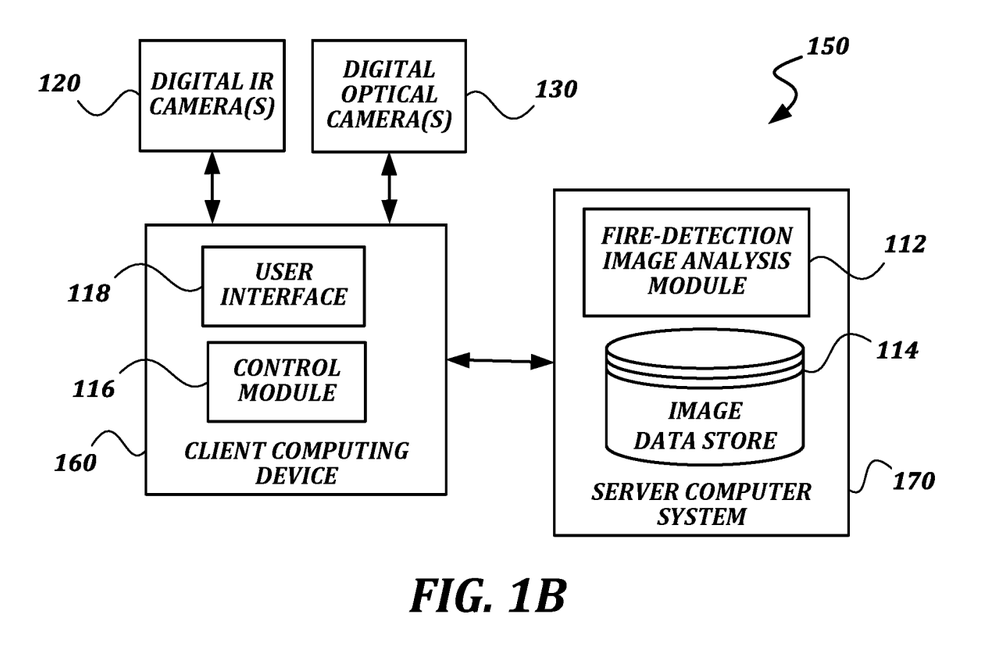

FIGS. 1A and 1B are block diagrams of illustrative automated image-based fire-detection systems in which described embodiments may be implemented. At a high level, these systems or other systems include functionality for performing operations described herein. An automated image-based fire-detection system may include multiple modules or engines to carry out different groups of tasks associated with different stages or phases. Such modules or engines may be implemented in the same computing device, or in different computing devices. These sections or engines may include submodules to carry out more specific tasks within the groups of tasks.

The processing steps, sections, or engines described herein may be assigned to different computing devices or to different processors within computing devices in various ways to achieve goals such as cost savings or improved processing speeds. As an example, deep learning tasks, which are computationally intensive, can be offloaded to either a separate processor or to another computer system entirely (e.g., a cloud instance). System design also may be based on other factors such as the availability of an Internet connection or the speed of such connections in remote areas. As an example, a system may adaptively switch between a distributed or cloud mode when a high-quality Internet connection is available and a local mode using local computing resources when a high-quality Internet connection is not available. Such a design may, for example, automatically switch to a local mode of operation when an Internet connection is detected to be unavailable over a threshold time period. Such a design can allow the system to remain functional (e.g., to activate local flame detection alarms) in the event that another fire, a weather event, or some other disruption has caused an Internet connection to become unavailable or unreliable.

FIG. 1A is a block diagram of an automated fire-detection image analysis system 100 in which described embodiments may be implemented. In the example shown in FIG. 1A, a computer system 110 includes a fire-detection image analysis module 112, an image data store 114, and a control module 116. The computer system includes one or more computing devices in which the illustrated modules 112, 116 and data store 114 may be implemented. The computer system 110 communicates with one or more digital IR cameras 120 and one or more digital optical cameras 130 to obtain IR and optical images for analysis. The computer system 110 uses the control module 116 to manage an automated image-based fire-detection process, according to one or more embodiments described herein. Alternatively, the computer system 110 obtains the images for analysis in some other way. For example, the computer system 110 may receive previously captured images from an external data source (e.g., a server computer), without engaging in any direct communication with an image capture device.

FIG. 1B is a block diagram of another automated fire-detection image analysis system 150 in which described embodiments may be implemented. In the example shown in FIG. 1B, a client computing device 160 (e.g., a laptop computer, tablet computer, smartphone, or the like) includes the control module 116 and a user interface 118 configured to allow a user of the client computing device 160 to interact with the system 150. The client computing device 160 is communicatively coupled to a server computer system 170 comprising one or more computing devices. The server computer system 170 includes the fire-detection image analysis module 112 and the image data store 114. The client computing device is also communicatively coupled with the digital IR camera(s) 120 and the digital optical camera(s) 130. The client computing device 160 uses the control module 116 to manage an automated image-based fire-detection process, according to one or more embodiments described herein. In an embodiment, the client computing device 160 receives captured IR and optical images images from the cameras 120, 130 and transmits the images to the server computer system 170 for further processing. Alternatively, the client computing device 160 instructs the cameras 120, 130 to transmit captured images directly to the server computer system 170 for processing.

Illustrative methods that may be performed by the illustrative systems 100, 150, or other systems, are described in detail below.

In an embodiment, a computer system detects candidate regions in an IR image by searching for "hot spots" (areas of high temperature exceeding a threshold temperature) and turbulent motion. If a region of turbulent motion is close to and above a hot spot, that area is a likely location for a fire.

In this process, the system analyzes pixel values in the IR images, in which larger pixel values indicate higher temperatures. A thresholding algorithm is used to identify higher-temperature pixels, which can then be analyzed with image processing techniques to determine whether the higher-temperature pixels may be associated with fire. For example, a combination of image smoothing or noise reduction (e.g., using a Gaussian blur technique) and contour detection can be applied to higher-temperature pixels to identify hot spots that are characteristic of fire in the image. Contour detection is useful for computing centroids and bounding boxes in described embodiments. Bounding boxes can be helpful for locating and analyzing features in the images such as hotspots and turbulent motion. (Illustrative uses of centroids and bounding boxes are described in further detail below.) In an embodiment, a perimeter-following algorithm is used to create contours for further processing. Alternatively, a combination of thresholding and connected-component analysis can be used.

Figure 2:
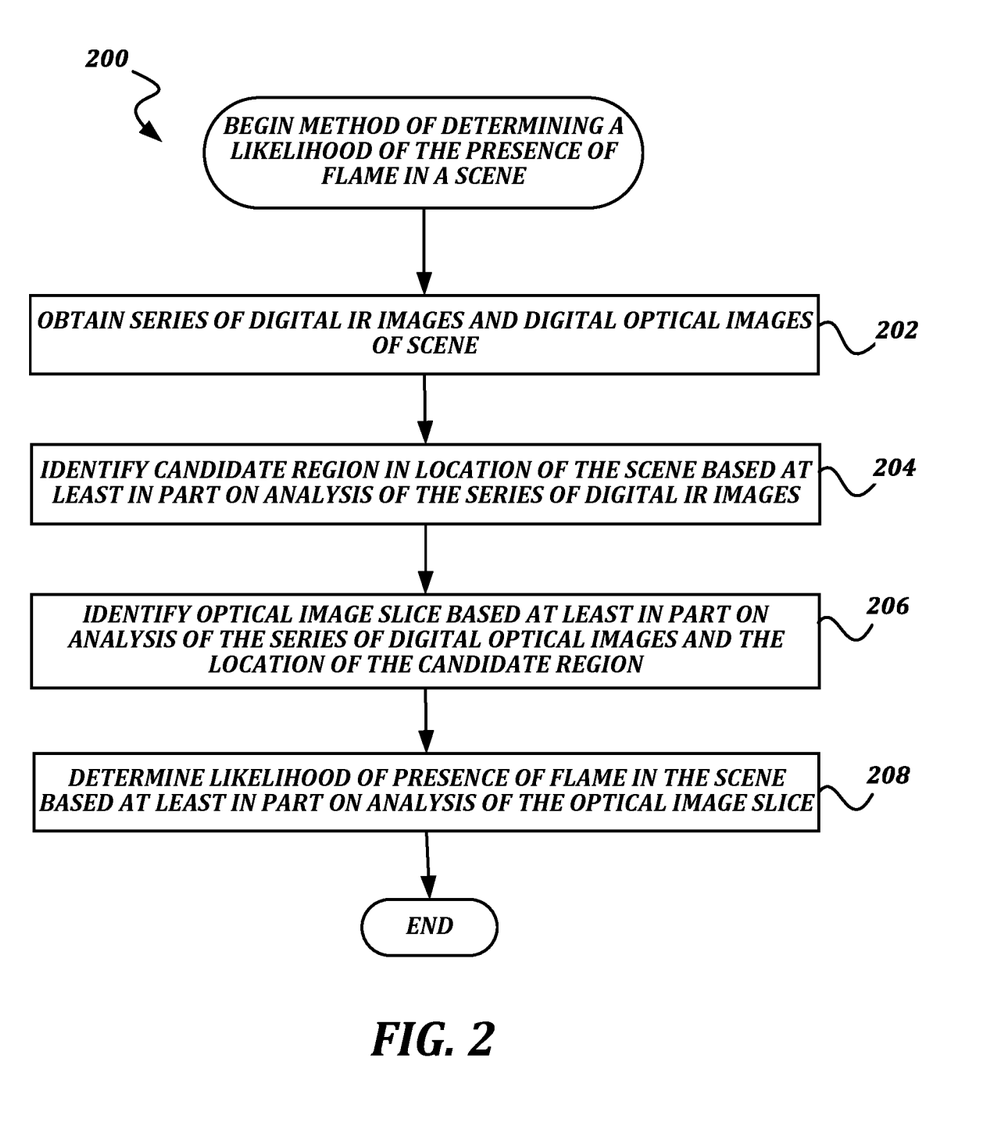
FIG. 2 is a flow chart of an illustrative method of determining a likelihood of the presence of flame in a scene.

FIG. 2 is a flow chart of an illustrative method 200 of determining a likelihood of the presence of flame in a scene. The method 200 may be performed by the system 100, the system 150, or some other computer system. At step 202, the system obtains a series of digital IR images and one or more digital optical images of a scene. At step 204, the system identifies a candidate region in a location of the scene based at least in part on analysis of the series of digital IR images. In an embodiment, the system uses the technique illustrated in FIG. 3 to identify candidate regions, as described in detail below.

Figure 3:
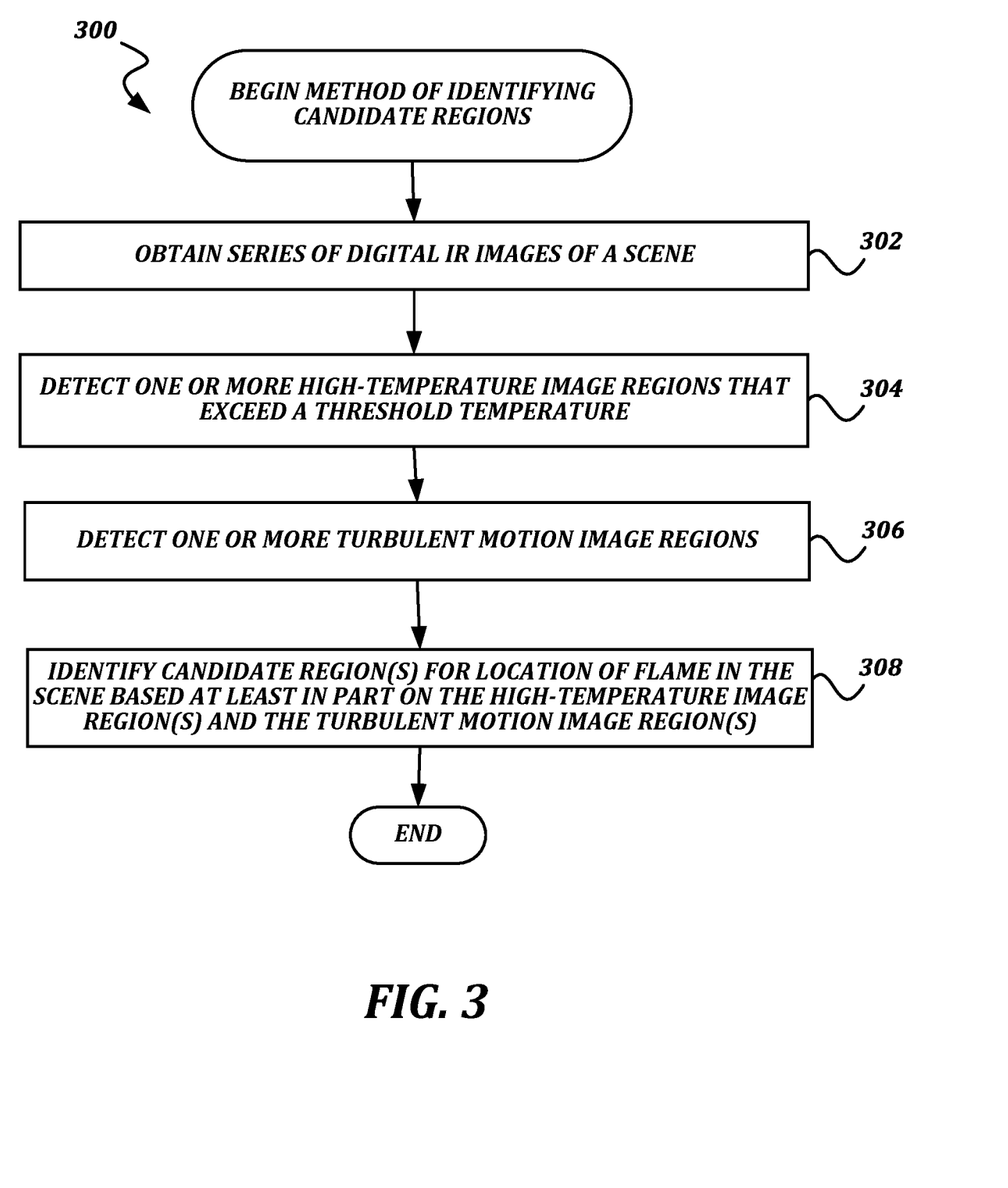
FIG. 3 is a flow chart of an illustrative method of identifying candidate regions.

FIG. 3 is a flow chart of an illustrative method 300 of identifying candidate regions that may be performed by the system 100, the system 150, or some other computer system. The method 300 may be performed as part of the method 200 (e.g., in step 204) or some other method. The method 300 also may be performed independently, such as in a system where IR images are used for flame detection without any analysis of optical images.

At step 302, the system obtains a series of digital IR images of a scene. At step 304, the system detects one or more high-temperature image regions in the scene that exceed a threshold temperature. In an embodiment, the threshold temperature is based on an adjustable sensitivity level. The sensitivity level may be adjusted manually (e.g., via user interface 118) or automatically (e.g., in response to detected weather conditions or other parameters).

In an embodiment, the system incorporates several possible sensitivity levels into the fire detection algorithm. Table 1 below includes illustrative sensitivity levels and corresponding pixel value ranges. In the example shown in Table 1, a "Very High" sensitivity threshold pixel value of 7,000 corresponds to a brightness temperature of approximately 70° C. at 10 cm from the sensor. The "Very Low" sensitivity threshold pixel value of 13,000 corresponds to a brightness temperature of approximately 170° C. at 10 cm from the sensor.

TABLE 1

| Sensitivity Level | Pixel Value Range |
|---|---|
| Very Low | >13,000 |
| Low | >11,500 |
| Medium | >10,000 |
| High | >8,500 |
| Very High | >7,000 |

In an illustrative scenario, the system includes a FLIR Lepton thermal camera with IR pixel value bit depth of 16 bits.

Table 2 below includes an alternative set of illustrative sensitivity levels and corresponding pixel value ranges for this camera. It will be understood that the particular bit depths, sensitivity levels and corresponding threshold values described herein are only examples, and that other bit depths, fewer or additional sensitivity levels, different threshold values, or different image capture devices may be used.

In the example shown in Table 2 below, a "Very High" sensitivity threshold pixel value of 5,000 corresponds to a brightness temperature of approximately 40° C. at 10 cm from the sensor. The "Very Low" sensitivity threshold pixel value of 15,000 corresponds to a brightness temperature of approximately 200° C. at 10 cm from the sensor.

TABLE 2

| Sensitivity Level | Pixel Value Range |
|---|---|
| Very Low | >15,000 |
| Low | >12,500 |
| Medium | >10,000 |
| High | >7,500 |
| Very High | >5,000 |

Threshold values can be adjusted to account for, e.g., desired levels of sensitivity, the distance at which fire is being detected, or the capabilities of the image-capture hardware. As an example, lower threshold temperatures may be used for higher fire detection sensitivity. However, lower thresholds also may be needed to detect flames at greater distances, because the actual "brightness temperature" observed in practice decreases rapidly with distance of the heat source from the sensor. A very large and hot fire measured at a distance of 200 m may still register a pixel value of only 10,000 or less. Threshold values may also be empirically adjusted for specific types of cameras.

In the examples shown in Tables 1 and 2, the pixel values for sensitivity levels between "Very Low" and "Very High" map to corresponding temperature values between the illustrative values identified above. The correspondence between pixel values and temperature in these examples is approximate. As is known in the art of IR imaging, the accuracy of temperature readings in IR images can vary significantly depending on factors such as the type of materials being imaged and the quality of the sensors that are used to obtain the readings. Some high-quality sensors may provide accuracy within ±0.5° C.

Once hot spots are detected, the thermal image is further analyzed to determine whether any turbulent motion of hot gases may be associated with the hot spot. This further processing can be used to distinguish hot spots from other non-flame hot spots (e.g., bright sun reflecting from a glass window or other reflective surface) and thereby avoid false-positives. For example, although sunlight reflected from a water surface may exhibit motion characteristics that are similar to flame in some respects, such reflected light would likely not be associated with turbulent motion of hot gases above the reflection.

Referring again to FIG. 3, at step 306, the system detects on or more turbulent motion regions in the scene. In an embodiment, turbulent motion regions are detected by analyzing motion in the IR images over time. Flames, smoke, and hot gases can be distinguished from their surroundings in IR video frames not only by differences in temperature, but by their distinctive motion characteristics. These characteristics may include, e.g., the sudden, oscillating movements associated with flickering flames, as well the variations in size and shape associated with hot gases rising from the flames.

In an embodiment, the following algorithm employs a scoring matrix to analyze differences between IR frames and detect probable turbulent motion regions:

- Let F(k) be the kth frame from an IR camera.
  Let D be the absolute value of the difference between consecutive frames F(k) and F(k−1).
  Let H be a scoring matrix with the same dimensions as each frame
  Let t be a threshold (e.g., a small integer greater than 5) used to determine if change is detected between frames.
  Let v be a threshold value used to determine if a fire candidate has been discovered in H.
  Let b1 and b2 be constants (in practice, b2 is typically 1).
- D = abs(F(k) − F(k−1)) # note this is a matrix operation
  For each H[x,y]:
    if D[x,y] >= t:
      H[x,y] = H[x,y] + b1
    else:
      H[x,y] = H[x,y] − b2
  If any of H[x,y] >= v, a probable turbulent motion region is detected.

Alternatively, the turbulent motion detection algorithm divides IR video frames into blocks of thermographic pixel values (e.g., 8×8 blocks or some other block size), identifies high-temperature blocks based on, e.g., the average pixel value of those blocks, and tracks the motion of these blocks over time from frame to frame. For example, the algorithm can start with a block in a first frame and search for a matching or nearly matching block in the next frame within a particular neighborhood of the original block, and calculate a motion vector that describes the movement of the block in the first frame to the next frame. Similar calculations can be performed for other time instances in the video stream by comparing other frames. In this way, motion of blocks of interest can be calculated over time in the video stream. The calculated motion within the video stream that is currently being analyzed can then be compared to previously identified turbulent motion using, e.g., a machine learning approach, such as a back-propagation neural network. In this way, probable turbulent motion regions can be identified.

Once the system has identified hot spots and turbulent motion regions, the system determines whether the hot spots and turbulent motion regions are positioned in such a way that fire is likely present in the frame. Referring again to FIG. 3, at step 308, the system identifies one or more candidate regions for possible locations of flame in the scene based at least in part on the locations of the high-temperature image region(s) and turbulent motion region(s). In an embodiment, the system checks images with N hot spots and M turbulent motion regions. For each hotspot, the system checks whether the turbulent motion region overlaps with the hotspot. If they do overlap, the system computes the centroid of the region and checks whether the centroid is above the hot spot in the frame. If it is, then the combined hot spot and turbulent motion region is identified as a candidate region for fire.

In a further embodiment, the system dilates each turbulent motion region prior to checking for overlap with the hotspot. If they overlap, the system computes the centroid of the dilated turbulent motion region and checks whether the centroid is above the hot spot in the frame. If it is, then the combined hot spot and dilated turbulent motion region is identified as a candidate region for fire.

The output of this part of the algorithm is a series of candidate regions in the infrared image that are likely to include fire. These candidate regions can be represented as, e.g., bounding rectangles or as a mask.

After one or more candidate regions are detected in a thermal IR image, corresponding portion(s) of corresponding optical image(s) is/are evaluated. The candidate regions restrict the areas of the optical image that need to be analyzed, which improves processing times compared with analyzing entire images. This can also make the overall system more efficient and reduce the risk of false positives.

Referring again to FIG. 2, at step 206 the system identifies an optical image slice based at least in part on analysis of the series of digital optical images and the location of the candidate region. For example, an optical image evaluation algorithm scans for possible flames in candidate regions by selecting the brightest pixel in each candidate region as the center of an image passed to a deep learning system. This algorithm design assumes that in cases where flame is present in a candidate region, the brightest pixel in that candidate region will be associated with that flame.

In an embodiment, the system chooses the brightest spot (e.g., a single pixel, a 3×3 set of pixels, a 5×5 set of pixels, or some other number of pixels) within the portion of the optical image corresponding to the candidate region as the center of a slice of the optical image. In an embodiment, the slice of the optical image is 128×128 pixels. Alternatively, other smaller or larger slice sizes may be used (e.g., 32×32, 299×299, 320×320, etc.) or slices of other shapes may be used. Alternatively, other optical image evaluation algorithms can be used.

At step 208, the system determines a likelihood of the presence of flame in the scene based at least in part on analysis of the optical image slice. In an embodiment, the optical image slice is passed to a deep learning system to determine if fire is present. In cases where the system determines that flame is likely to be present, the system can perform further actions to alert users or the public, or otherwise mitigate the risk posed by fire. In an embodiment, if the deep learning system detects flames in the optical image slice, an alarm state is set. The alarm state may trigger actions locally or at a remote location. For example, the alarm state may activate an audible or visual alarm, activate a fire suppression system (e.g., a sprinkler system), or some other activity. For example, the alarm state may cause the system to generate automated messages (e.g., SMS messages) or phone alerts, cause information to be displayed on a roadway variable-message sign, or take some other action. The alarm state also may cause the system to transmit a signal to a remote computer system, which may take further action such as the actions described above, or other actions.

The deep learning system can be implemented in different ways. For example, in a training phase, the system may present an untrained convolutional neural network architecture with a set of training data on the order of thousands of images, including a representative sample of images that contain fire and a representative sample of images that do not contain fire. In the training phrase, the system can repeatedly feed training data to the neural network. Using techniques such as back-propagation and stochastic gradient descent, the system can train the neural network to discover relevant features that may be needed for the relevant classification problem: whether fire is present or not.

In an embodiment, the deep learning system comprises a modified SqueezeNet deep neural network for computer vision applications, which provides good accuracy and a compact memory footprint of approximately 6 MB, and with a 128×128×3 input tensor. The modified SqueezeNet was trained on approximately 250,000 image samples to provide outputs indicating whether fire was detected or not. Alternatively, other deep learning systems (such as a MobileNet lightweight deep neural network) that take image data as input, and are capable of providing outputs to indicate whether fire is detected, may be used. The specific type or configuration of a machine learning system can be chosen based on parameters such as desired processing speed, desired ease of training, desired accuracy levels, available training images, available computing resources, and the like.

The number of image slices passed to the deep learning system during analysis of a particular image may depend on factors such as tile size, the input size of the deep learning system, or the size of the candidate region. In practice, the application of this algorithm may involve several dozen deep learning passes per image frame.

In an embodiment, the deep learning system returns a value or score that represents a degree of confidence that flame is present in the image, between 0 (for no flames likely to be present) to 1 (when a flame is likely present). Different levels of sensitivity are possible for this determination, as shown in Table 3 below: It will be understood that the particular sensitivity levels and corresponding threshold confidence values described herein are only examples, and that fewer or additional sensitivity levels, or different threshold values may be used.

TABLE 3

| Sensitivity Level | Confidence Value Range |
| --- | --- |
| Very Low | >0.95 |
| Low | >0.85 |
| Medium | >0.75 |
| High | >0.65 |
| Very High | >0.55 |

In an embodiment, the system includes options for adjusting sensitivity levels based on fire conditions or weather data, such as temperature, humidity, and wind speed. As an example, the Hot-Dry-Windy Index is a recent innovation in evaluating fire weather risk. Other data that may be used in this process include the Haines Index, though the Hot-Dry-Windy Index may be more desirable. Higher values of the Hot-Dry-Windy Index correlate well with the risk of rapidly spreading (and therefore dangerous) wildfires.

Fire condition information or weather data can be used in multiple ways. One technique involves using index values to automatically set sensitivity levels, such as those one or more of the sensitivity levels described above for, e.g., machine learning confidence values or threshold pixel values. An example of this technique is shown in Table 4, below.

TABLE 4

| Hot-Dry-Windy Index Value | Sensitivity |
| --- | --- |
| 0-10 | Very Low |
| 11-40 | Low |
| 41-99 | Medium |
| 100-299 | High |
| >300 | Very High |

Another possible technique involves modifying the user interface of the system to permit a user-specified sensitivity level and use fire conditions or weather data to determine whether to adjust that sensitivity up or down. In an illustrative scenario, a user assigns a sensitivity of "High", "Medium", or "Low". If the Hot-Dry-Windy Index is less than 40, the actual sensitivity used by the system would be one level lower, and if the Hot-Dry-Windy Index is greater than 100, the sensitivity used by the system would be one level higher.

Figure 4:
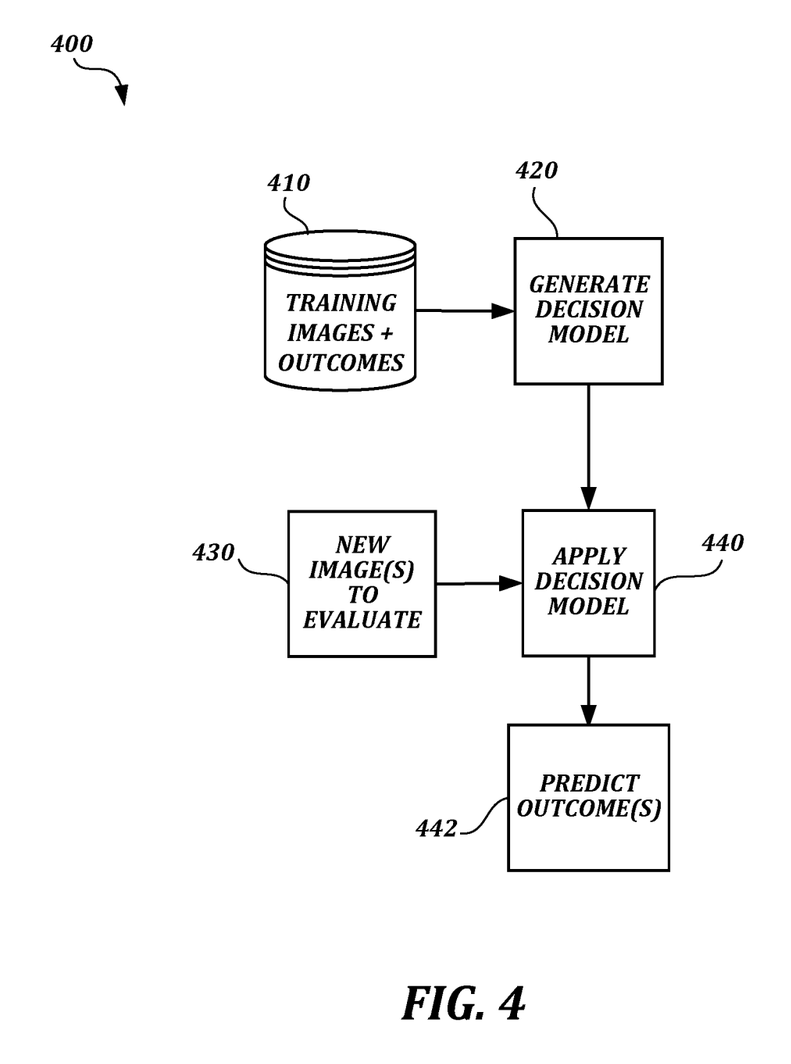
FIG. 4 is a flow chart depicting an illustrative supervised machine learning system that may be used in accordance with described embodiments.

FIG. 4 is a flow chart depicting an illustrative supervised machine learning system that may be used in accordance with described embodiments. Alternatively, other machine learning approaches, such as semi-supervised or unsupervised learning, may be used. In the example shown in FIG. 4, an illustrative machine learning system 400 obtains a set of training images or video segments and related metadata from a data store 410. The data store 410 may be updated as needed, e.g., to provide additional training images and related metadata.

In a learning or training phase, the system 400 determines which features of the set of training images materially affect predictive ability. The output of the learning/training phrase can be a described as generating a decision model (process block 420) that can be used to predict outcomes. Such predicted outcomes may be used to determine whether fire is likely to be present in a new image or video stream. Features selected for inclusion in the decision model may include, for example, features having a numerical predictive value that exceeds a threshold value. Features that do not have significant predictive value can be excluded. Such models may be constructed using logistic regression, decision trees, or some other method that may be suitable for machine learning in a computer vision context. Training also may be performed using semi-supervised or unsupervised learning techniques, such as k-means or neural networks, to segment the training data into classes. The learning phase also may be performed using other machine learning methods.

In an evaluation phase, the system 400 obtains and processes a new image or video segment at process block 430. In a prediction phase, the system 400 applies the decision model to the new image or video segment at process block 440 and predicts one or more outcomes at process block 442 (e.g., "fire" or "not fire" or). A score between 0 and 1 can be assigned, with a greater score indicating higher confidence that fire is present.

Figure 5:
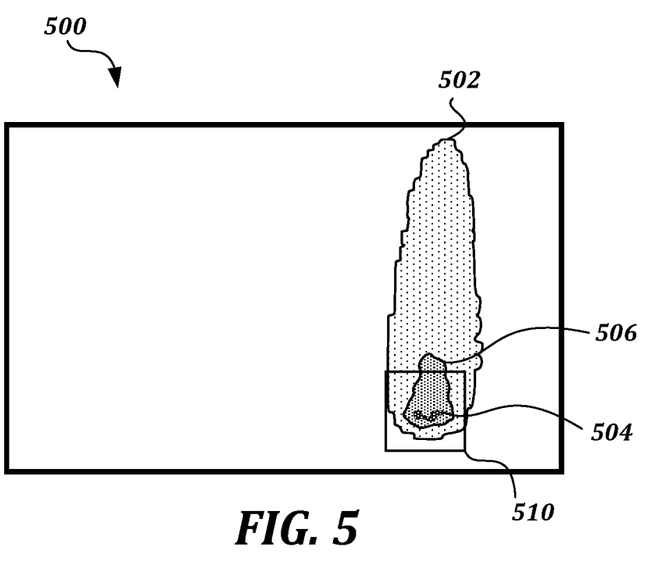
FIG. 5 is a diagram of an illustrative annotated IR image depicting a calculation of a candidate region in an image-based fire detection system.

FIG. 5 is a diagram of an illustrative annotated IR image depicting a calculation of a candidate region in an image-based fire detection system, in accordance with embodiments described herein. In the example shown in FIG. 5, the scene includes a flame. The annotated image 500 depicts a turbulent motion region 502, a first high-temperature region 504 that lacks turbulent motion, and a second high-temperature region 506 in which turbulent motion is also detected. A bounding box 510 depicts a candidate region 510 that has been calculated by the system based on the locations of the turbulent motion and high-temperature regions. The annotated image 500 may be presented to a user via a user interface (e.g., user interface 118) with or without a corresponding alert when a candidate region is detected, indicating a high likelihood of flame in the scene.

Figure 6:
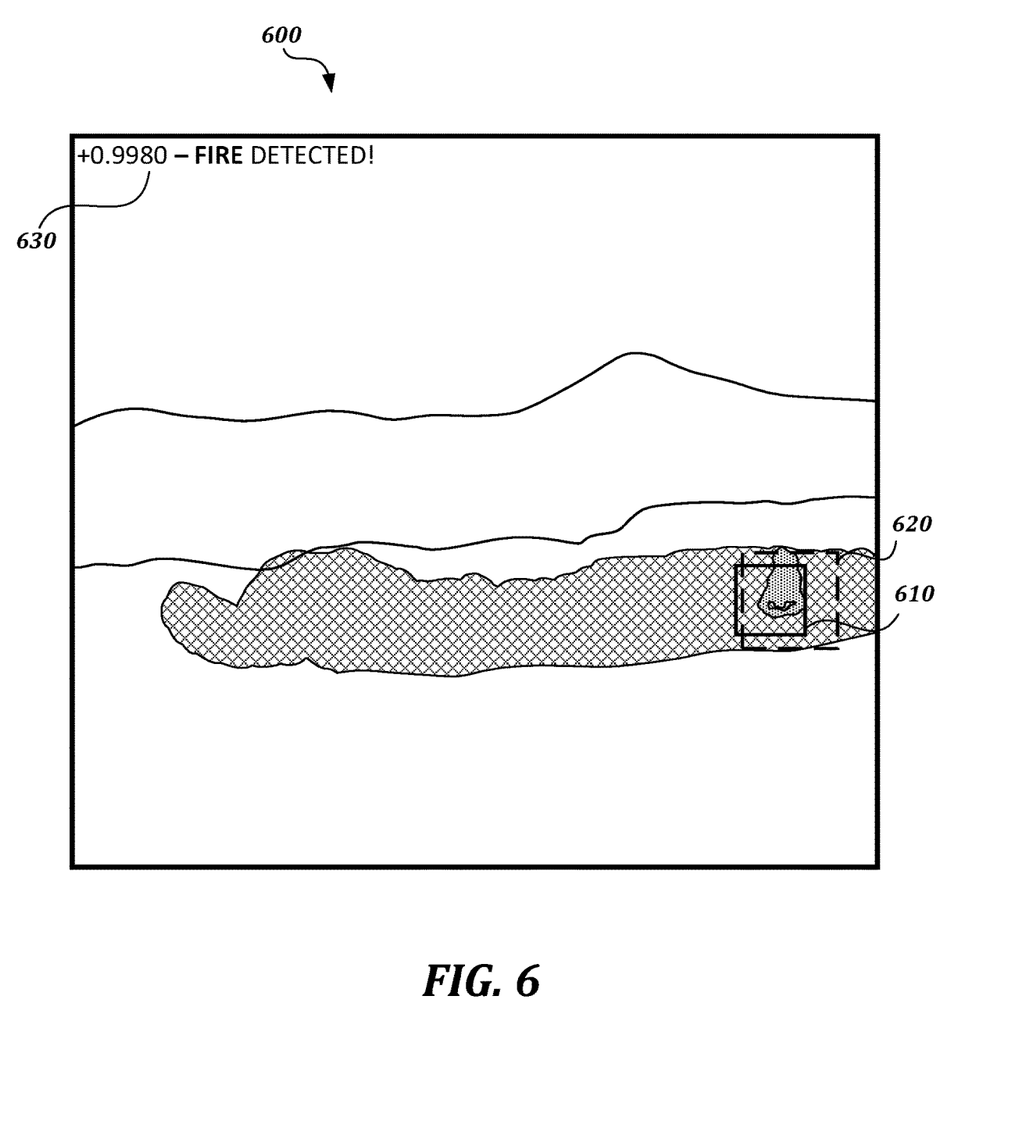
FIG. 6 is a diagram of an illustrative annotated image depicting calculations of a candidate region and an optical image slice in an image-based fire detection system.

FIG. 6 is a diagram of another illustrative annotated image 600 depicting calculations of a candidate region and an optical image slice in an image-based fire detection system, in accordance with embodiments described herein. In the example shown in FIG. 6, the scene also includes a flame. As shown, the annotated image 600 is an annotated IR image that includes a bounding box 620 indicating an optical image slice identified by the machine learning component as likely including fire. The annotated image 600 also includes a bounding box 610 indicating a candidate region identified by the system using IR image analysis. The annotated image 600 also includes an alert message 130, showing a calculated high-confidence value of 0.9980 along with an indication that fire has been detected. As in FIG. 5, the annotated image 600 may be presented to a user via a user interface (e.g., user interface 118).

Although individual annotated images are shown in FIGS. 5 and 6 for ease of illustration, in some embodiments the output may include a series of images or a video segment, of optical images or of IR images. In such embodiments, the bounding boxes can be presented in the form of an animation showing changes over time. Furthermore, it should be understood that such images may include additional annotations, such as distinctively colored markers to indicate specific areas of the image associated with turbulent motion, in addition to or in place of corresponding bounding boxes.

More generally, candidate regions, hotspots, image slices and bounding boxes need not be one-time calculations, but instead may be repeatedly calculated over time, for each frame or selected frames of a series. In some embodiments, further insights may be gained from tracking characteristics of bounding boxes over time, including their location, size/area, and orientation. For example, in a fire bounding boxes associated with rising hot air tend to exhibit disordered behavior, which will distinguish those bounding boxes from boxes associated with other heat sources (e.g. hot vehicle exhaust or hot air rising from a dark surface) and help to avoid false positives.

Illustrative Devices and Operating Environments

Unless otherwise specified in the context of specific examples, described techniques and tools may be implemented by any suitable computing device or set of devices.

In any of the described examples, an engine (e.g., a software engine working in combination with infrared and/or optical imaging systems) may be used to perform actions described herein. An engine includes logic (e.g., in the form of computer program code) configured to cause one or more computing devices to perform actions described herein as being associated with the engine. For example, a computing device can be specifically programmed to perform the actions by having installed therein a tangible computer-readable medium having computer-executable instructions stored thereon that, when executed by one or more processors of the computing device, cause the computing device to perform the actions. The particular engines described herein are included for ease of discussion, but many alternatives are possible. For example, actions described herein as associated with two or more engines on multiple devices may be performed by a single engine. As another example, actions described herein as associated with a single engine may be performed by two or more engines on the same device or on multiple devices.

In any of the described examples, a data store contains data as described herein and may be hosted, for example, by a database management system (DBMS) to allow a high level of data throughput between the data store and other components of a described system. The DBMS may also allow the data store to be reliably backed up and to maintain a high level of availability. For example, a data store may be accessed by other system components via a network, such as a private network in the vicinity of the system, a secured transmission channel over the public Internet, a combination of private and public networks, and the like. Instead of or in addition to a DBMS, a data store may include structured data stored as files in a traditional file system. Data stores may reside on computing devices that are part of or separate from components of systems described herein. Separate data stores may be combined into a single data store, or a single data store may be split into two or more separate data stores.

Some of the functionality described herein may be implemented in the context of a client-server relationship. In this context, server devices may include suitable computing devices configured to provide information and/or services described herein. Server devices may include any suitable computing devices, such as dedicated server devices. Server functionality provided by server devices may, in some cases, be provided by software (e.g., virtualized computing instances or application objects) executing on a computing device that is not a dedicated server device. The term "client" can be used to refer to a computing device that obtains information and/or accesses services provided by a server over a communication link. However, the designation of a particular device as a client device does not necessarily require the presence of a server. At various times, a single device may act as a server, a client, or both a server and a client, depending on context and configuration. Actual physical locations of clients and servers are not necessarily important, but the locations can be described as "local" for a client and "remote" for a server to illustrate a common usage scenario in which a client is receiving information provided by a server at a remote location. Alternatively, a peer-to-peer arrangement, or other models, can be used.

Figure 7:
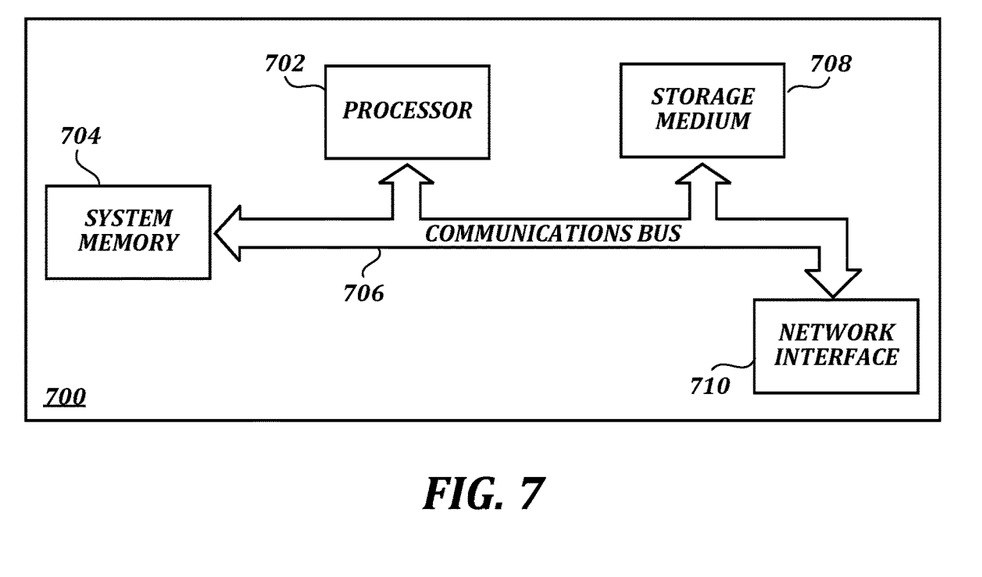
FIG. 7 is a block diagram of an illustrative computing device in accordance with embodiments of the present disclosure.

FIG. 7 is a block diagram that illustrates aspects of an illustrative computing device 700 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure. Computing devices described herein may be integrated with specialized hardware, such as infrared and/or optical imaging systems, for obtaining images, or as stand-alone devices that obtain images for analysis in some other way, such as by receiving images stored remotely in a cloud computing arrangement.

In its most basic configuration, the computing device 700 includes at least one processor 702 and a system memory 704 connected by a communication bus 706. Depending on the exact configuration and type of device, the system memory 704 may be volatile or nonvolatile memory, such as read only memory ("ROM"), random access memory ("RAM"), EEPROM, flash memory, or other memory technology. Those of ordinary skill in the art and others will recognize that system memory 704 typically stores data and/or program modules that are immediately accessible to and/or currently being operated on by the processor 702. In this regard, the processor 702 may serve as a computational center of the computing device 700 by supporting the execution of instructions.

As further illustrated in FIG. 7, the computing device 700 may include a network interface 710 comprising one or more components for communicating with other devices over a network. Embodiments of the present disclosure may access basic services that utilize the network interface 710 to perform communications using common network protocols. The network interface 710 may also include a wireless network interface configured to communicate via one or more wireless communication protocols, such as WiFi, 4G, LTE, 5G, WiMAX, Bluetooth, and/or the like.

In the illustrative embodiment depicted in FIG. 7, the computing device 700 also includes a storage medium 708. However, services may be accessed using a computing device that does not include means for persisting data to a local storage medium. Therefore, the storage medium 708 depicted in FIG. 7 is optional. In any event, the storage medium 708 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like.

As used herein, the term "computer-readable medium" includes volatile and nonvolatile and removable and nonremovable media implemented in any method or technology capable of storing information, such as computer-readable instructions, data structures, program modules, or other data. In this regard, the system memory 704 and storage medium 708 depicted in FIG. 7 are examples of computer-readable media.

For ease of illustration and because it is not important for an understanding of the claimed subject matter, FIG. 7 does not show some of the typical components of many computing devices. In this regard, the computing device 700 may include input devices, such as a keyboard, keypad, mouse, trackball, microphone, video camera, touchpad, touchscreen, electronic pen, stylus, and/or the like. Such input devices may be coupled to the computing device 700 by wired or wireless connections including RF, infrared, serial, parallel, Bluetooth, USB, or other suitable connection protocols using wireless or physical connections.

In any of the described examples, input data can be captured by input devices and processed, transmitted, or stored (e.g., for future processing). The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 700 (e.g., a client device), or can be integral components of the computing device 700. In some embodiments, multiple input devices may be combined into a single, multifunction input device (e.g., a video camera with an integrated microphone). The computing device 700 may also include output devices such as a display, speakers, printer, etc. The output devices may include video output devices such as a display or touchscreen. The output devices also may include audio output devices such as external speakers or earphones. The output devices can be separate from and communicatively coupled to the computing device 700, or can be integral components of the computing device 700. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Extensions and Alternatives

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, in an alternative embodiment of the above-described optical image evaluation algorithm, the evaluation of the optical image includes application of a modified Sliding Window algorithm to the optical image to scan for possible flames in the image. In the modified Sliding Window algorithm, the image is broken into tiles, which are then scanned. In an embodiment, the tiles are 32×32 pixels. Alternatively, tiles may be smaller or larger, or have different aspect ratios. The modified Sliding Window algorithm first inspects a tile at an initial location (e.g., the top left corner of the image) to determine whether the tile intersects with a candidate region in a corresponding thermal IR image. The modified Sliding Window algorithm then shifts to inspect further tiles according to a predetermined pattern (e.g., left-to-right and top-to-bottom). For example, the top left corner of a first 32×32 tile may be located at (0, 0) within the image, the top left corner of a second 32×32 tile may be located at (32, 0) within the image, and so on. Alternatively, rather than dividing the image into discrete non-overlapping tiles, the algorithm may shift by 1, 2, 4, or some other number of pixels at a time, such that the tiles being inspected partially overlap one another. In an embodiment, this Sliding Window approach can employ a larger window to improve performance while still maintaining good fire detection accuracy.

Many adjustments to this part of the algorithm are possible to account for limitations in computing resources, desired speed or accuracy, and the like. In order to maintain a higher frame rate and conserve computing resources, the algorithm may process a limited number of tiles at a first set of locations in a first frame, and continue the evaluation at a second set of locations in the next frame. As an example, the system may inspect tiles in a checkerboard pattern, by inspecting tiles located at {(0, 0), (64, 0), (128, 0), (32, 32), (96, 32), (160, 32) . . . } in a first frame, and tiles located at {(32, 0), (96, 0), (160, 0), (0, 32), (64, 32), (128, 32) . . . } in a second frame.

As explained above, the candidate regions can be helpful to restrict the areas of the optical image that need to be analyzed. For example, rather than inspecting every tile of an image, the system can inspect only tiles that intersect with a candidate region in the IR image. If a tile intersects with a candidate region in the thermal IR image, the system chooses the brightest spot within the tile as the center of a slice of the optical image.

More generally, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A non-transitory computer-readable medium having stored thereon computer-executable instructions configured to cause one or more computing devices to determine a likelihood of the presence of flame in a scene by performing operations comprising:
   obtaining a series of digital infrared images and digital optical images of a scene;
   identifying a candidate region in a location of the scene based at least in part on analysis of temperature and turbulent motion in the series of digital infrared images;
   identifying an optical image slice within an optical image region corresponding to the location of the candidate region based at least in part on analysis of the series of digital optical images; and
   determining a likelihood of the presence of flame in the scene based at least in part on analysis of the optical image slice.

2. The non-transitory computer-readable medium of claim 1, wherein the analysis of the series of digital infrared images comprises:
   detecting one or more high-temperature image regions in the series of digital infrared images that exceed a threshold temperature; and
   detecting one or more turbulent motion image regions in the series of digital infrared images.

3. The non-transitory computer-readable medium of claim 2, wherein the analysis of the series of digital infrared images further comprises determining whether a turbulent motion image region is within a specified proximity of or overlaps with a high-temperature image region.

4. The non-transitory computer-readable medium of claim 2, wherein the threshold temperature is based on an adjustable sensitivity level.

5. The non-transitory computer-readable medium of claim 1, wherein identifying the optical image slice comprises identifying the brightest pixel in the optical image region corresponding to the candidate region.

6. The non-transitory computer-readable medium of claim 1, wherein the analysis of the optical image slice comprises:
   passing the optical image slice as input to a trained neural network; and
   obtaining a degree of confidence from the trained neural network that flame is present in the optical image slice.

7. The non-transitory computer-readable medium of claim 1 wherein the operations further include, based on the determined likelihood of the presence of flame in the scene, setting an alarm state.

8. The non-transitory computer-readable medium of claim 1, wherein the operations further include, based on the determined likelihood of the presence of flame in the scene, initiating one or more of the following actions:
   transmitting a signal to a remote computing device;
   activating a visual or audible alarm;
   activating a fire suppression system;
   generating one or more automated messages or phone calls;
   causing information to be displayed on a roadway variable-message sign.

9. A non-transitory computer-readable medium having stored thereon computer-executable instructions configured to cause one or more computing devices to determine regions in digital infrared images that are likely to include flame by performing operations comprising:
   obtaining a series of digital infrared images of a scene;
   detecting one or more high-temperature image regions in the scene that exceed a threshold temperature based on analysis of the series of digital infrared images;
   detecting one or more turbulent motion image regions in the scene based on analysis of the series of digital infrared images; and
   identifying one or more candidate regions for location of flame in the series of digital infrared images based at least in part on locations of the one or more high-temperature image regions and the one or more turbulent motion image regions.

10. The non-transitory computer-readable medium of claim 9, the operations further comprising determining whether one or more of the detected turbulent motion image regions are within a specified proximity of, or overlap with at least one of the one or more high-temperature image regions.

11. The non-transitory computer-readable medium of claim 9, wherein the threshold temperature is based on an adjustable sensitivity level.

12. A system comprising one or more computing devices comprising one or more processors, the one or more computing devices being programmed to determine a likelihood of the presence of flame in a scene by performing operations comprising:
    obtaining a series of digital infrared images and digital optical images of a scene;
    identifying a candidate region in a location of the scene based at least in part on analysis of temperature and turbulent motion in the series of digital infrared images;
    identifying an optical image slice within an optical image region corresponding to the location of the candidate region based at least in part on analysis of the series of digital optical images;
    determining a likelihood of the presence of flame in the scene based at least in part on analysis of the optical image slice.

13. The system of claim 12, wherein the analysis of the series of digital infrared images comprises:
    detecting one or more high-temperature image regions in the series of digital infrared images that exceed a threshold temperature; and
    detecting one or more turbulent motion image regions in the series of digital infrared images.

14. The system of claim 13, wherein the analysis of the series of digital infrared images further comprises determining whether a turbulent motion image region is within a specified proximity of or overlaps with a high-temperature image region.

15. The system of claim 13, wherein the threshold temperature is based on an adjustable sensitivity level.

16. The system of claim 12, wherein identifying the optical image slice comprises identifying the brightest pixel in the optical image region corresponding to the candidate region.

17. The system of claim 12, wherein the analysis of the optical image slice comprises:
    passing the optical image slice as input to a trained neural network; and
    obtaining a degree of confidence from the trained neural network that flame is present in the optical image slice.

18. The system of claim 12, wherein the operations further include, based on the determined likelihood of the presence of flame in the scene, initiating one or more of the following actions:
    transmitting a signal to a remote computing device;
    activating a visual or audible alarm;
    activating a fire suppression system;
    generating one or more automated messages or phone calls;
    causing information to be displayed on a roadway variable-message sign.

19. The system of claim 12 further comprising a digital infrared camera, wherein the digital infrared camera captures the series of digital infrared images.

20. The system of claim 12 further comprising a digital optical camera, wherein the digital optical camera captures the series of digital optical images.

21. The system of claim 12, wherein the analysis of the series of digital infrared images comprises detecting one or more high-temperature image regions in the series of digital infrared images that exceed a threshold temperature, and wherein the threshold temperature is based at least in part on weather conditions including temperature, humidity, and wind speed.

22. The non-transitory computer-readable medium of claim 9, wherein the threshold temperature is based at least in part on weather conditions including temperature, humidity, and wind speed.

* * * * *